Nov. 20, 1962  H. MITTAG  3,065,401
POWER SUPPLY SYSTEM FOR A VEHICLE
Filed April 4, 1961  2 Sheets-Sheet 1

INVENTOR
Hermann Mittag
By
Michael S. Striker
Attorney

Nov. 20, 1962

H. MITTAG 3,065,401

POWER SUPPLY SYSTEM FOR A VEHICLE

Filed April 4, 1961

INVENTOR
Hermann Mittag
By
Michael S. Striker
Attorney

United States Patent Office 3,065,401
Patented Nov. 20, 1962

3,065,401
POWER SUPPLY SYSTEM FOR A VEHICLE
Hermann Mittag, Stuttgart-Botnang, Germany, assignor to Robert Bosch, G.m.b.H., Stuttgart, Germany
Filed Apr. 4, 1961, Ser. No. 100,702
Claims priority, application Germany Apr. 8, 1960
9 Claims. (Cl. 322—25)

The present invention concerns an electric power supply system adapted for use on a vehicle, particularly for furnishing lighting current on a motor vehicle.

Usually generators used in power supply systems of this type are equipped with voltage regulator means which constitute a separate unit connected with the generator proper by means of a multi-wire cable including a multi-pole disconnectable plug and socket connection.

In power supply systems of this kind it is highly undesirable to pass the entire load current which is furnished by the generator and supplied to the partly low resistance current consuming devices through the regulator means because the magnitude of the load current is likely to generate substantial amounts of heat in the regulator whereby the accuracy of the regulating operation would be impaired. In addition, it is necessary to provide, between the output terminals of the generator and the terminals of the storage battery usually supplied thereby, a device which prevents the battery from being discharged across the windings of the generator when the latter is standing still or is not sufficiently excited. Particularly well suited for this purpose is a semi-conductor rectifier which, however, is particularly sensitive to variations of the ambient temperature.

On the other hand it is desirable to mount the regulator arrangement, in view of usually restricted space availability in the neighborhood of the generator, at a remote location better suited for this purpose, for instance at the dashboard of the vehicle.

It is therefore a main object of the invention to provide in an electric power supply system for vehicles, including generator and voltage regulator means, an arrangement of the various components of the regulator means in such a manner that those components of the regulator means which are less sensitive to temperature variations and less likely to develop heat in operation, are mounted remote from the generator, while other components of the regulator means which are likely to heat up during operation and are sensitive to temperature variations are mounted in a location where they are subject to a cooling action.

It is a further object of this invention to provide in an arrangement as set forth a plug and socket connection which is most practical with respect to its mounting and its operation.

With above objects in view the invention provides in an electric power supply system adapted for use on a vehicle, in combination, a generator having a housing and ventilating means for moving cooling air through said housing; voltage regulator means for regulating the output of said generator, said regulator means comprising a first group of regulator members located remote from said generator, and a second group of regulator members cooperating with said first group, said second group of regulator members being mounted inside said housing so as to be cooled by said cooling air moving therethrough; and circuit means interconnecting said first group of regulator members with said second group thereof and with said generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
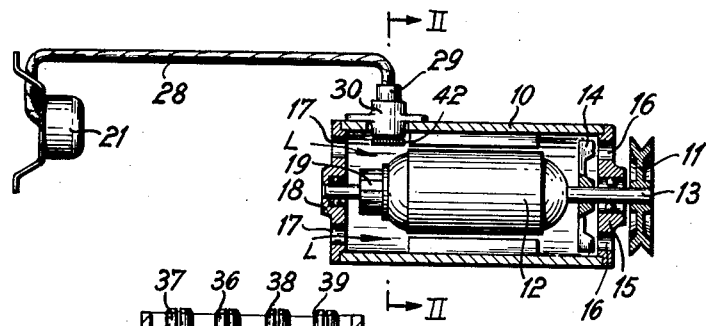
FIG. 1 is a diagrammatic illustration showing a generator in axial section together with a portion of the regulator means connected thereto by a cable.

The generator according to FIG. 1 comprises within a tubular housing 10 an armature 12 supported by bearings in end plates 15 and 18 and driven by means of a pulley 11 mounted on the armature shaft 13. A fan wheel 14 is mounted inside the housing on the shaft 13 for rotation therewith. The end plate 15 between the fan wheel 14 and the pulley 11 is provided with a plurality of perforations 16 and similarly the end plate 18 which is mounted near the collector 19 is provided with perforations 17 so that a cooling air stream L is sucked in through the perforations 17 by the action of the fan wheel 14 and is ejected from the housing through the perforations 16.

Figure 3:
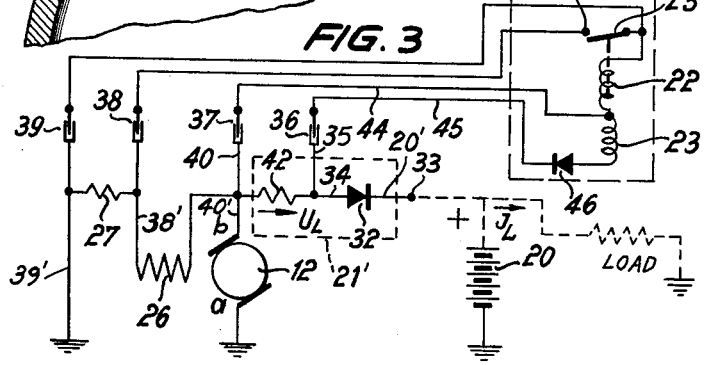
FIG. 3 is a schematic circuit diagram of the power supply system comprising the generator and regulator means according to FIGS. 1 and 2.

As can be seen from FIG. 3, the generator serves to supply from its armature 12 sufficient charge current to the battery 20 usually rated for 12.6 volts and additionally to furnish a load current $J_L$ to current consumers connected in parallel with the battery, the load current being not permited to exceed a maximum value depending upon the characteristics and the size of the generator. In order to enable the generator to furnish, in spite of considerably varying rotary speeds thereof and of variations of the load, as uniform a voltage as possible, a voltage regulator arrangement is provided one portion of which is indicated at 21 in FIGS. 1 and 3 and which contains an electromagnetic relay. This relay has two energizing coils, namely a voltage coil 22 and a current coil 23 which operate a normally closed pair of contacts 24, 25 connected, as shown, in the exciter circuit of the generator. The exciter circuit starts at the positive brush $b$ in FIG. 3 and includes the exciter winding 26 (not shown in FIG. 1) and a series-connected resistor 27, and is closed through a connection 39' and electrical ground at the negative brush $a$. As can be seen from FIG. 3, the normally closed contacts 24, 25 of the regulator shunt the series-resistor 27 at the start of the generator until thereafter developing exciter current passing through the exciter winding 26 causes generation of a sufficiently high output voltage between the brushes $a$ and $b$ which is the case when the generator is driven with sufficiently high rotary speed.

Figure 2:
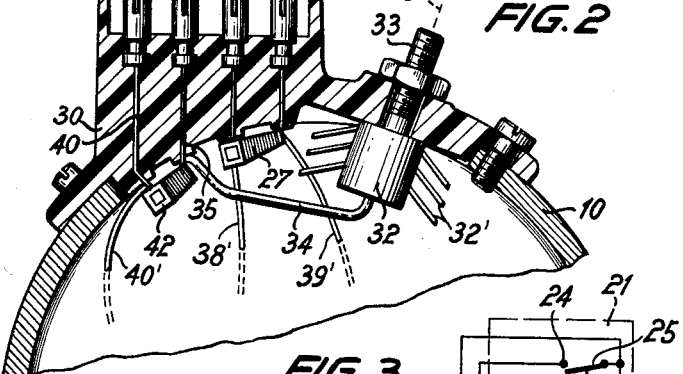
FIG. 2 is a partial transverse section at enlarged scale taken along line II—II of FIG. 1.

The portion 21 of the regulator arrangement is connected with the generator by a four-wire cable 28 which terminates in a socket assembly 29. This socket assembly can be connected in conventional manner with a corresponding plug assembly 30 which according to the invention is mounted on the generator housing 10 so that the socket and plug assemblies 29, 30 constitute a disconnectable connection. In the embodiment according to FIG. 2, the body of the plug assembly 30 is formed by molded or compressed insulating material and serves additionally as the support and mounting base for a second group of components of the entire regulator arrangement. The second group is indicated by the dotted frame 21' in FIG. 3 and comprises a silicon diode 32 connected between the positive brush $b$ of the generator and the positive terminal of the battery 20, the output terminal of the diode 32 being formed according to FIG. 2 as a bolt 33 to which the connection 20' leading to the battery 20 may be attached in conventional manner. The other electrode of the diode 32 is connected by a connection 34 to a lead 35 which is arranged together with the pertaining plug 36 in the body of the plug assembly 30. This body 30 contains in addition three further plugs 37, 38 and 39 which terminate at the inner face of the body 30 which projects into a corresponding opening of the housing 10. Between the junction formed between the leads 34 and 35, on one hand, and a lead 40 connected to the plug 37, on the other hand, a control resistor 42 is connected and, as can be seen from FIGS. 1 and 2, is mounted in a position in which it is exposed to the current L of cooling air passing through the housing during operation of the generator. The control resistance 42 is connected in series with the return current preventing diode 32 connected between the positive brush $b$ and the output terminal 33 of the diode. As can be seen from FIG. 3, two wires 44 and 45 of the four-wire cable 28 lead from the plug and socket connections 37, 36, respectively to the current coil 23 of the relay in the unit 21. A semi-conductor resistance 46 is connected in series with the current coil 23, this resistance 46 being constituted by highly alloyed germanium containing a p-n-layer and having in well known manner a distinct break in its current-voltage characteristic at .3 volt. This semi-conductor resistance has the effect that only a small control current flows through the current coil 23 as long the voltage drop $U_L$ produced by the load current $J_L$ across the control resistance 42 remains smaller than .3 volt, however, that a very strong control current flows through the coil 23 as soon as the just mentioned critical voltage value is exceeded. In consideration of a maximum permissible value of the load current $J_L$ depending upon the characteristic and type of the generator, the resistance 42 may have e.g. a resistance value of .01 ohm and furnishes therefore the critical voltage drop of .3 volt required for the start of the current regulation, when the load current $J_L$ reaches 30 amps. The control current which under these circumstances flows through the semi-conductor resistance 46 and the current coil 23 increases the magnetic field produced by the voltage coil 22 of the relay and has the effect that the excitation is reduced by separating the contacts 24, 25 whereby the output voltage of the generator is reduced to a value which is that much lower than the normal value of 12.6 volts as the load current $J_L$ tends to rise beyond its permissible maximum value.

The exciter series-resistance 27 which is intermittently shunted by the closing of the contacts 24, 25 and is placed into circuit again upon a rise of the voltage beyond the rated value thereof, is mounted, similarly as the control resistance 42, also on the inner face of the body 30 of the plug assembly and thus also exposed to the cooling effect of the air stream L in the generator housing 10.

It should be noted that the body of the diode 32 is also equipped with cooling fins 32' so as to participate in the cooling effect by the air stream in the housing 10. It can be seen from the above that that group of components of the regulator arrangement which is either likely to develop heat during operation or is sensitive to rising temperatures, is mounted jointly on the inner face of the plug assembly body 30 and exposed to the cooling effect of the air. On the other hand, the other group of components of the regulator arrangement is mounted at a more convenient location 21 remote from the generator. In the case of necessity, e.g. for carrying out repairs or for exchanging the generator, the connection between the two groups of components can be conveniently interrupted by separating the socket assembly 29 from the plug assembly 30.

Figure 4:
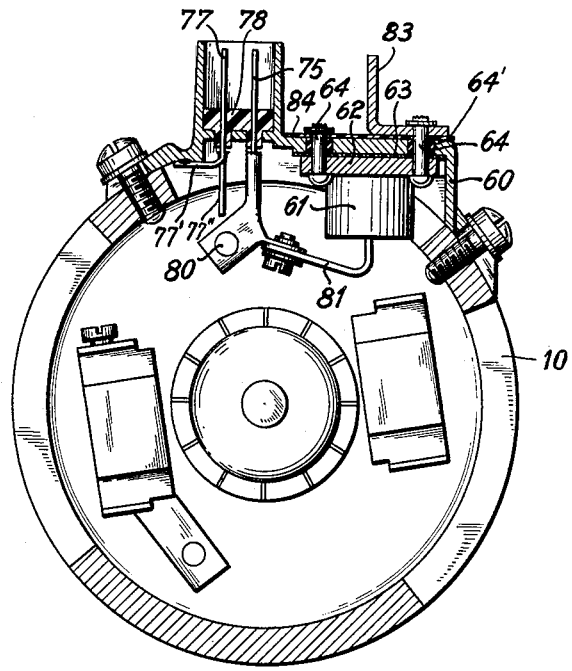
FIG. 4 is a diagrammatic transverse section of a generator taken also substantially along line II—II of FIG. 1, showing a modification of the regulator connection according to the invention.
Figure 5:
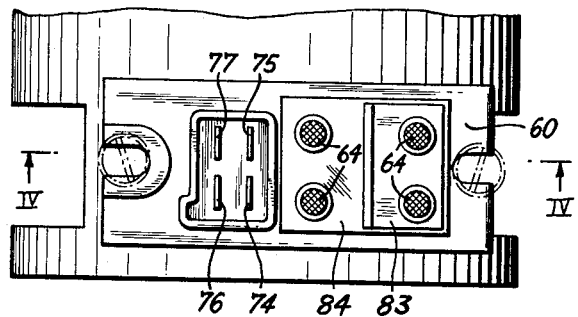
FIG. 5 is a fractional plan view of the arrangement according to FIG. 4.

While in the above described embodiment, illustrated particularly by FIG. 2, the body of the plug assembly 30 consists entirely of insulating material so that the diode 32 is mounted directly in this insulating body, the modified embodiment according to FIGS. 4 and 5 differs mainly in this respect from the first described embodiment. According to FIGS. 4 and 5 the body of the plug assembly is a metal housing 60 which may be cast, diecast, pressed or otherwise manufactured and is attached to the housing 10 by screws so as to close a corresponding opening in the housing 10. The housing 60 has a recess in which four plugs 74–77 are mounted embedded in insulating material 78. The housing 60 has further a substantially flat shoulder portion on which is mounted a silicon diode 61 of different structure but similar function as the diode 32 of FIG. 2. The diode 61 has a substantially square, flat base plate 62 which serves as output electrode. This portion 62 is separated from the adjacent portion of the housing 60 by a plate of mica 63 of only .05 mm. thickness and is held in position by means of rivets 64 which are insulated against the housing 60 by sleeves of insulating material 64' and by another sheet of insulating material 84. Two of the rivets 64 serve also to hold, in conductive connection, an angle member 84 which serves as outer terminal in a manner similar to that of terminal 33 in FIG. 2. It can be seen again that the body of the diode 61 is exposed to the cooling air stream inside the housing 10, but in addition the above described mounting has the favorable effect that the transmission of heat from the diode to the housing 60 through thermal conductivity is so good that losses of only 5° C./w. appear and that the diode even upon the occurrence of the maximum permissible load current will heat up to a temperature only 20° C. above the temperature of the housing 10.

The four plugs 74 to 77 project rather far from the inner face of the housing 60 toward the center of the generator housing. The plug 77 is split at its inner end, one portion 77' being bent for being attached by solder to the adjacent portion of the housing 60 for establishing connection with electrical ground because the plug 77 corresponds to the plug 39 of FIG. 2 and FIG. 3. The second portion 77'' of the lower end of plug 77 serves to make connection with a resistor 27, not shown in FIG. 4. A control resistor 80, corresponding to the control resistor 42 in FIGS. 2 and 3, is mounted below the housing 60 and also exposed to the cooling air current while being connected on one side to the plug 75 and on the other side to the input electrode 81 of the diode 61. The other plug pins function in the same manner as their counter-parts in FIGS. 2 and 3.

It should be noted that it is a particular advantage of the arrangement according to the invention, that the group of components of the regulator means which is intended to be located within the generator housing 10 for being exposed to the cooling air stream, are all mounted on the inner face of the body 30 or 60 of the plug assembly. This results in a great convenience during mass production of the particular type of electric power supply systems because the generators proper can be produced in regular assembly-line production, while the two portions of the regulator means, in turn, can likewise be produced in assembly-line fashion separately, the final assembly of the generators with the regulator means causing not the least difficulty. In addition, the general substantial advantage is obtained that those regulator components which are mounted on the plug assembly are subject to efficient cooling so that they can stand higher loads and/or be dimensioned correspondingly smaller.

It should be noted, that in both embodiments a plug assembly has been described as bein mounted on the generator while a corresponding socket assembly is mounted at the end of the connector cable 28. Of course, the coupling portion 29 could as well be a plug assembly while the coupling portion 30 could be a corresponding socket assembly.

It will be understood that each of the elements described above, or two or more together, may also find a useful application in other types of details of an electric power supply system differing from the types described above.

While the invention has been illustrated and described as embodied in regulator arrangement for a generator in an electric power supply system adapted for use on a vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electric power supply system adapted for use on a vehicle, in combination, a generator having a housing and ventilating means for moving cooling air through said housing; voltage regulator means for regulating the output of said generator, said regulator means comprising a first group of regulator members located remote from said generator, and a second group of regulator members cooperating with said first group, said second group of regulator members being mounted inside said housing so as to be cooled by said cooling air moving therethrough; and circuit means interconnecting said first group of regulator members with said second group thereof and with said generator.

2. In an electric power supply system adapted for use on a vehicle, in combination, a generator having a housing and ventilating means for moving cooling air through said housing; voltage regulator means for regulating the output of said generator, said regulator means comprising a first group of regulator members including relay means located remote from said generator, and a second group of regulator members including return-current cut-out rectifier means and relay control resistor means in series-connection cooperating with said first group and subject to be heated by generator load current passing therethrough, said second group of regulator members being mounted inside said housing so as to be cooled by said cooling air moving therethrough; and circuit means interconnecting said first group of regulator members with said second group thereof and with said generator.

3. In an electric power supply system adapted for use on a vehicle, in combination, a generator having a housing and ventilating means for moving cooling air through said housing; voltage regulator means for regulating the output of said generator, said regulator means comprising a first group of regulator members including relay means located remote from said generator, and a second group of regulator members including return-current cut-out rectifier means and relay control resistor means in series-connection cooperating with said first group and subject to be heated by generator load current passing therethrough, and exciter series-resistor means, said second group of regulator members being mounted inside said housing so as to be cooled by said cooling air moving therethrough; and circuit means interconnecting said first group of regulator members with said second group thereof and with said generator.

4. In an electric power supply system adapted for use on a vehicle, in combination, a generator having a housing and ventilating means for moving cooling air through said housing; voltage regulator means for regulating the output of said generator, said regulator means comprising a first group of regulator members including relay means located remote from said generator, and a second group of regulator members including at least a low resistance control resistor controlling said relay means cooperating with said first group and subject to be heated by generator load current passing therethrough, said second group of regulator members being mounted inside said housing so as to be cooled by said cooling air moving therethrough; and circuit means interconnecting said first group of regulator members with said second group thereof and with said generator.

5. An arrangement as claimed in claim 1, wherein said circuit means include disconnectible coupling means having a first coupling portion connected with said first group of regulator members, and a second coupling portion carrying said second group of regulator members, said housing having an opening and said second coupling portion being mounted over said opening so as to cause said second group of regulator means to project into the interior of said housing.

6. An arrangement as claimed in claim 2, wherein said circuit means include disconnectible coupling means having a first coupling portion connected with said first group of regulator members, and a second coupling portion carrying said second group of regulator members, said housing having an opening and said second coupling portion being mounted over said opening so as to cause said second group of regulator means to project into the interior of said housing.

7. An arrangement as claimed in claim 3, wherein said circuit means include disconnectible coupling means having a first coupling portion connected with said first group of regulator members, and a second coupling portion carrying said second group of regulator members, said housing having an opening and said second coupling portion being mounted over said opening so as to cause said second group of regulator means to project into the interior of said housing.

8. An arrangement as claimed in claim 4, wherein said circuit means include disconnectible coupling means having a first coupling portion connected with said first group of regulator members, and a second coupling portion carrying said second group of regulator members, said housing having an opening and said second coupling portion being mounted over said opening so as to cause said second group of regulator means to project into the interior of said housing.

9. An arrangement as claimed in claim 6, wherein said second coupling portion is made of metal, and wherein said rectifier means and said second coupling portion have comparatively large mounting surfaces, respectively, and are assembled with said surfaces facing each other at close proximity sufficient for causing through thermal conductivity removal of heat developing in said rectifier means.

No references cited.